United States Patent [19]

Janis et al.

[11] Patent Number: 5,119,493
[45] Date of Patent: Jun. 2, 1992

[54] SYSTEM FOR RECORDING AT LEAST ONE SELECTED ACTIVITY FROM A SELECTED RESOURCE OBJECT WITHIN A DISTRIBUTED DATA PROCESSING SYSTEM

[75] Inventors: Frederick L. Janis, Keller; Marvin L. Williams, Lewisville; Diana S. Wang, Trophy Club, all of Tex.

[73] Assignee: International Business Machines Corporation, Armonk, N.Y.

[21] Appl. No.: 484,706

[22] Filed: Feb. 23, 1990

[51] Int. Cl.⁵ .................. G06F 11/30; G06F 11/32; G06F 11/34

[52] U.S. Cl. .................. 395/650; 364/242.94; 364/242.95; 364/264.4; 364/267.4; 364/267; 364/267.8; 364/269.4; 364/280; 364/281.3; 364/284.4; 364/283.3; 364/281.7; 364/DIG. 2; 371/19

[58] Field of Search ........... 364/200, 900, 512; 235/92; 371/18, 19

[56] References Cited

U.S. PATENT DOCUMENTS

| | | | |
|---|---|---|---|
| 4,041,472 | 8/1977 | Shah et al. | 364/900 |
| 4,161,024 | 7/1979 | Joyce et al. | 364/200 |
| 4,310,883 | 1/1982 | Clifton et al. | 364/200 |
| 4,339,657 | 7/1982 | Larson et al. | 235/92 |
| 4,511,960 | 4/1985 | Boudreau | 364/200 |
| 4,636,940 | 1/1987 | Goodwin, Jr. | 371/19 |
| 4,797,885 | 1/1989 | Orimo et al. | 371/19 |
| 4,809,170 | 2/1989 | Leblang et al. | 364/200 |
| 4,858,146 | 8/1989 | Shebini | 364/512 |
| 4,937,740 | 6/1990 | Agarwal et al. | 364/200 |
| 4,953,096 | 8/1990 | Wachi et al. | 371/19 |

Primary Examiner—Thomas C. Lee
Assistant Examiner—Daniel Pan
Attorney, Agent, or Firm—Andrew J. Dillon

[57] ABSTRACT

A method for maintaining a selective document history log within a data processing system having multiple resource objects which are accessible by a plurality of users within the data processing system. A history log is created and associated with each resource object for which documentation of selected activities is desired. Next, a list of one or more types of activity is generated and utilized to filter all activities which take place with respect to a particular resource object. Thereafter, documentation of each activity which corresponds to an entry on the list of activities of interest is recorded within the selective document history log. In this manner it is possible to accurately record only those activities of interest such that memory space is more efficiently utilized within the document history log. The system administrator or other manager may limit the authority of a user to establish a document history log.

6 Claims, 3 Drawing Sheets

SYSTEM FOR RECORDING AT LEAST ONE SELECTED ACTIVITY FROM A SELECTED RESOURCE OBJECT WITHIN A DISTRIBUTED DATA PROCESSING SYSTEM

CROSS-REFERENCE TO RELATED APPLICATIONS

The present application is related to the following United States patent applications, each by the inventors hereof, filed of even date herewith and assigned to the assignee herein:

U.S. Pat. application Ser. No. 07/484,606, entitled "Method For Maintaining A Time Frame Selective Document History Log In A Data Processing System";

U.S. Pat. application Ser. No. 07/484,701, entitled "Method For Memory Management Within A Document History Log In A Data Processing System";

U.S. Pat. application Ser. No. 07/484,704, entitled "Method For Automatic Generation Of Document History Log Exception Reports In A Data Processing System"; and U.S. Pat. application Ser. No. 07/484,705, entitled "Method For Maintaining An Alterable Document History Log In A Data Processing System," now U.S. Pat. No. 5,062,045.

The contents of each of the above-referenced applications are hereby incorporated herein by reference thereto.

BACKGROUND OF THE INVENTION

1. Technical Field

The present invention relates in general to data processing systems and in particular to an improved method of maintaining multiple resource objects within a data processing system. Still more particularly, the present invention relates to a method for maintaining a selective document history log in which only selected activities with respect to a particular resource object are recorded.

2. Description of the Related Art

In large modern data processing systems it is possible to create, store, and access literally thousands of documents or resource objects. Such activities may take place with regard to many users within a data processing system and it is often necessary to keep track of selected resource objects within the system to assure system integrity and maintain a record with regard to selected resource objects or documents within the system.

Document history logs are well known in the prior art. Many operating systems, database management subsystems and network subsystems marketed by International Business Machines of Armonk, New York incorporate logging facilities. For example, the Multiple Virtual Storage (MVS) operating system provides a logging system to the console operator so that all commands by the operator as well as the responses of the system are logged. Additionally, other events within the system may be written to the operator log. The logging filter in this system is set system wide for all resources within the system by the system programmer. As with all such logging systems this system may be utilized to provide a record for problem reconciliation and to provide an audit trait for security purposes.

Database management systems, such as Customer Information Control System (CICS) and Information Management System (IMS) also utilize a history log. Such history logs are typically utilized to audit events and changes within the database. These logs are then utilized to reconstruct the database in the event of an abnormal termination of the system. As above, such logs record all counts within the system based upon a filter set for the entire system by the database administrator.

Finally, certain network communications subsystems, such as VTAM, or Virtual Telecommunication Access Method utilize a history log system to log all network commands and responses. These logs are utilized for problem solving and are generally written to tape or disk storage.

In view of the above, it should be apparent that a need exists for a document history log which may be specified for individual resources within a system so that only selected activities with regard to particular resources will be stored within the log.

SUMMARY OF THE INVENTION

It is therefore one object of the present invention to provide an improved data processing system.

It is another object of the present invention to provide an improved method of maintaining multiple resource objects within a data processing system.

It is yet another object of the present invention to provide a method for maintaining a selective document history log in which only selected activities with respect to a particular resource object are recorded.

The foregoing objects are achieved as is now described. The method of the present invention may be utilized to maintain a selective document history log with regard to multiple resource objects within a data processing system, each of which may be accessible by a plurality of users within the system. A history log is created and associated with each resource object for which documentation of selected activities is desired. Next, a list of one or more activities is generated and utilized to filter all activities which take place with respect to a particular resource object. Thereafter, documentation of each activity which corresponds to an entry on the list of activities of interest is recorded within the selective document history log. In this manner, it is possible to accurately record only those activities of interest such that memory space is more efficiently utilized within the document history log. In a preferred embodiment of the present invention, the system administrator or other manager may limit the authority of a user to establish a document history log.

BRIEF DESCRIPTION OF THE DRAWINGS

The novel features believed characteristic of the invention are set forth in the appended claims. The invention itself however, as well. as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
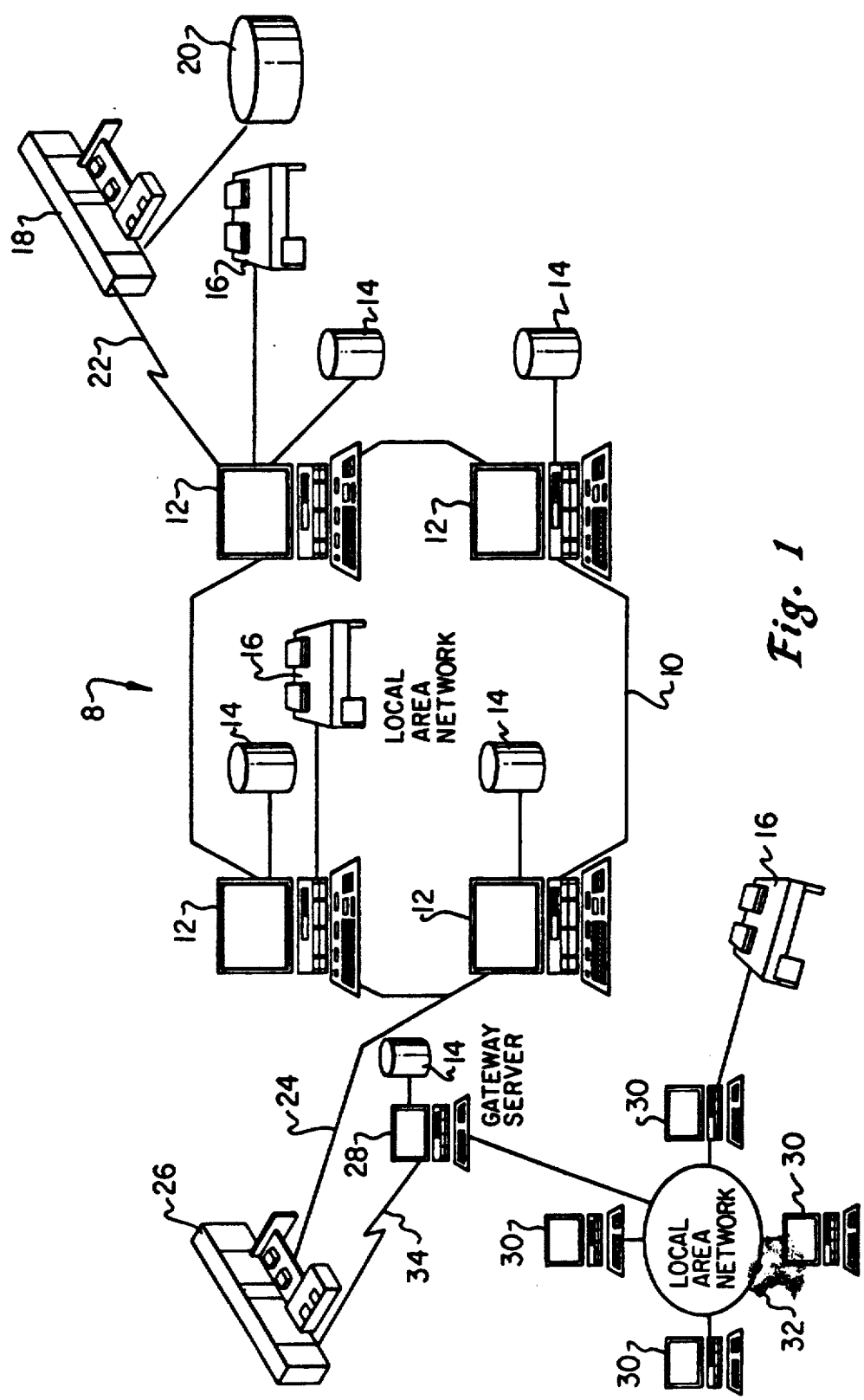
FIG. 1 depicts a pictorial representation of a distributed data processing system which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 is associated with a Resource Manager or Library Service, which is responsible for maintaining and updating all resource objects associated therewith.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 21 and controlled by main frame computer 12, as Resource Manager of Library Service for the resource objects thus stored. Of course, those skilled in the art will appreciate that main frame computer 18 may be located a great geographic distance from Local Area Network (LAN) 60 and similarly Local Area Network (LAN) 10 may be located a substantial distance from Local Area Network (LAN) 32. That is, Local Area Network (LAN) 32 may be located in California while Local Area Network (LAN) 10 may be located within Texas and main frame computer 18 may be located in New York.

In known prior art systems of this type it is common for a user in one area of distributed data processing system 8 to access and/or modify a document or resource object within another portion of distributed data processing system 8. It should therefore be apparent that it would be very helpful to have a system whereby the activities of any or all of the users within distributed data processing system 8 with respect to a particular document or resource object may be recorded. However, with known document history log approaches the vast number of users within a distributed data processing system, such as the system illustrated, would clearly overwhelm a system which simply records each and every activity with regard to a particular resource object.

Figure 2:
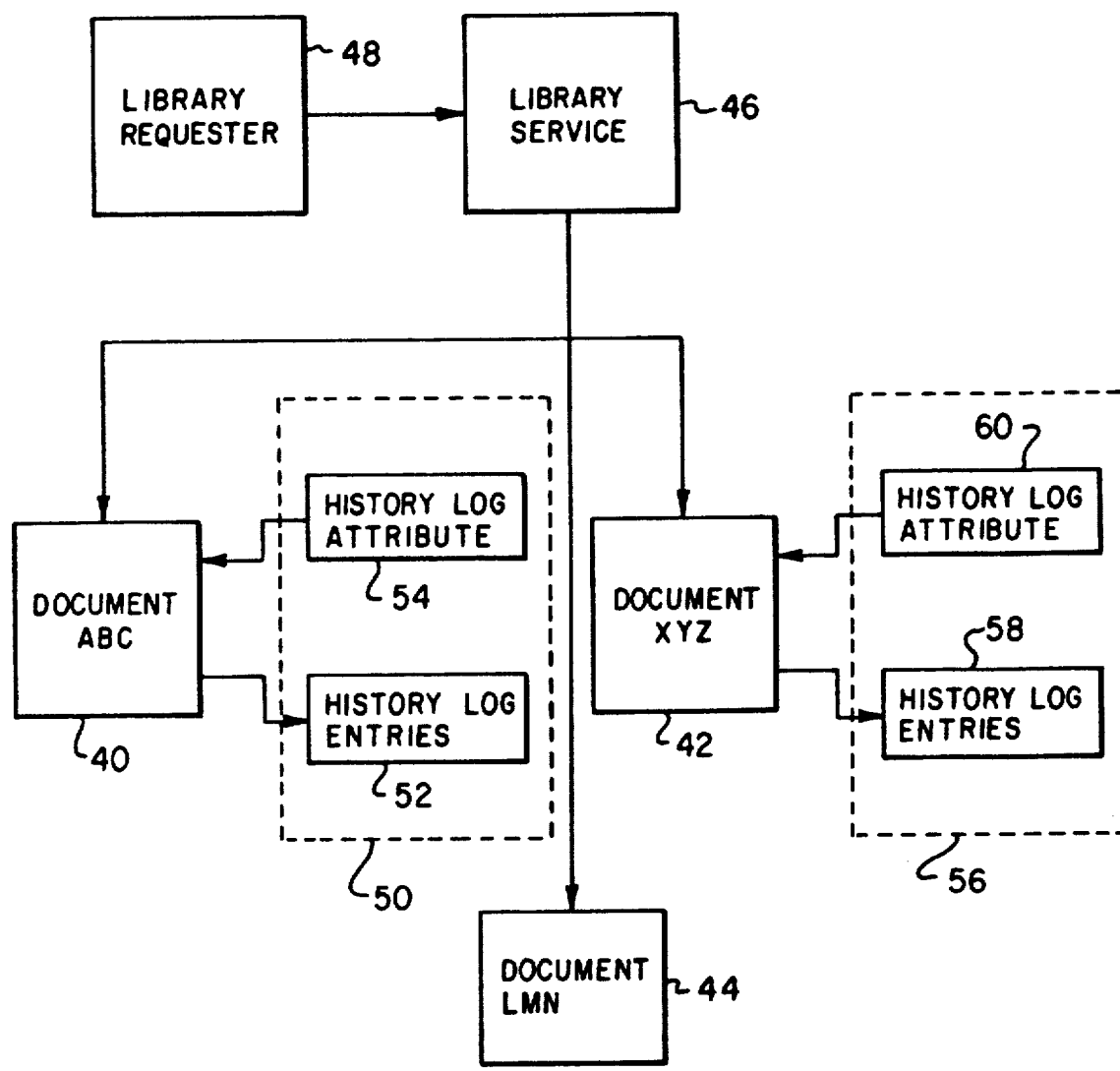
FIG. 2 depicts in block diagram form the selective document history log system in accordance with the method of the present invention.

Referring now to FIG. 2, there is depicted a block diagram representation of a selective document history log implemented in accordance with the method of the present invention. As can be seen, three documents are represented. Document ABC 40, document XYZ 42 and document LMN 44 are all illustrated as being under the control of library service 46. As discussed above, library service 46 may be implemented utilizing any entity within distributed data processing system 8 (see FIG. 1) which is capable of acting as a resource manager for the documents thus illustrated. Additionally, a library requester 48 is illustrated. Library requester 48 shall correspond to any user within distributed data processing system 8 who desires to access a document or resource object controlled by library service 46.

As is illustrated, each and every document controlled by library service 46 does not require a document history log, in accordance with the method of the present invention. As is illustrated, document ABC 40 and document XYZ 42 both have associated therewith a document history log. That is, document history log 50 is associated with document ABC 40 and document history log 56 is associated with document XYZ 42. Document LMN 44 does not require a history log and no such log is illustrated.

In accordance with an important aspect of the present invention, it should be noted that each document history log thus illustrated includes two separate portions thereof. Specifically, document history log 50 includes a section labeled history log entries 52 and a section labeled history log attribute 54. Similarly, document history log 56 includes a section labeled history log entries 58 and history log attribute 60.

As those skilled in the art will appreciate, each history log entry section shall merely comprise a memory location wherein the recordation of activities with regard to an associated document may take place. However, history log attributes 54 and 60 are utilized, in accordance with the method of the present invention, to specify those selected activities with regard to each document associated with the history log for which a recording is desired. For example, it may be desired to only record those activities of any library requester who attempts to alter a document. Thus, the activities of library requesters who only view a document will result in no entries being recorded within the document history log.

In this manner it is possible to provide a selective history log in which only those activities of interest to the system administrator or manager are entered. This method provides a more efficient utilization of memory space within a document history log such that thousands of activities which are of no interest to the system administrator may take place without filling valuable memory space. Of course, as disclosed in one of the cross-referenced applications, each memory portion within a document history log may have associated therewith a protocol to follow in the event the memory space does become full. For example, the protocol may specify that new activity logs shall be written over the oldest activity logs stored within the memory space.

It should be apparent that within each memory location corresponding to a history log entry it will be possible to store various parameters associated with the activities which take place with respect to a particular document. For example, user information may be stored, as well as date and time information. A version number or version reference may be stored as well as the reviser's personal name and any comments which the reviser desires to leave within the history log.

Figure 3:
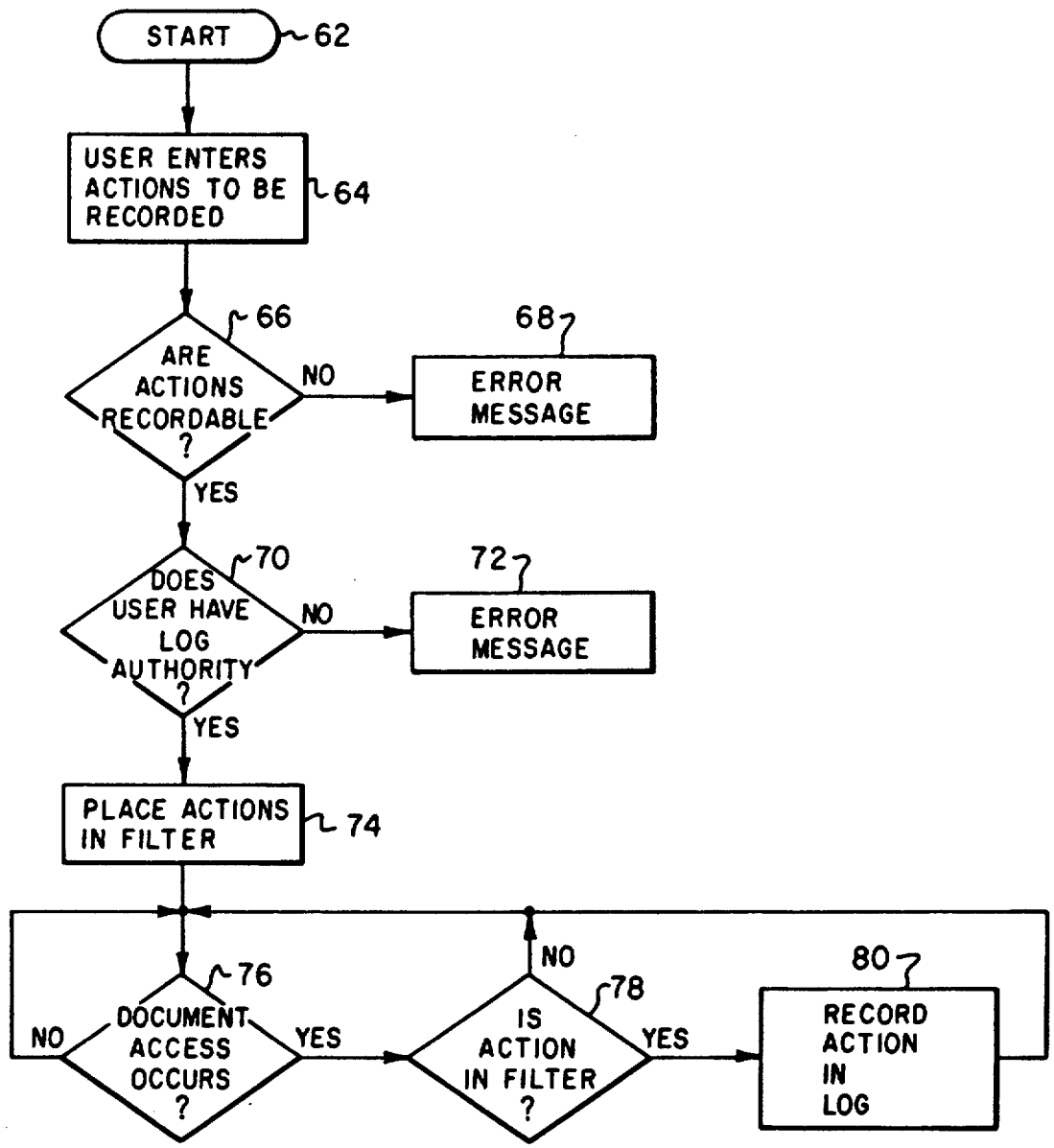
FIG. 3 is a high level flow chart depicting the method for maintaining a selective document history log in accordance with the method of the present invention.

With reference now to FIG. 3, there is depicted a high level flow chart which illustrates the method of maintaining a selective document history log in a data processing system in accordance with the method of the present invention. As is illustrated, the process begins at block 62 and thereafter passes to block 64 which illustrates the entering by a user of a list of actions to be recorded. Next, block 66 depicts a determination of whether or not the actions entered by the user are indeed recordable. The system administrator or other manager may specify that only selected actions are recordable in order to maintain a consistent log format throughout the data processing system. In the event the actions specified by the user are not recordable, then block 68 illustrates a returning of an error message to the user.

In the event the actions specified by the user are indeed recordable, as determined by the determination illustrated in block 66, then block 70 illustrates a determination of whether or not the user in question has the authority to record activities with regard to a specific document. Of course, those skilled in the art will appreciate that some semblance of administration cannot be maintained within a distributed data processing system if each and every user within a large system has the authority to implement a document history log. Thereafter, in the even the user in question does not have the authority to implement a document history log, an error message is returned, as depicted in block 72.

After determining that the user in question has specified a list of activities which are indeed recordable, and that the user has the authority to implement a document history log, as illustrated in blocks 66 and 70, then block 74 depicts the placing of this list of activities within a filter. By "filter" what is meant is an application or program which may be utilized to compare the specified list of activities with all activities which take place with regard to a particular document or resource object.

Thereafter, block 76 illustrates a determination that a document for which a document history log has been specified has been accessed. When such an access occurs, block 78 illustrates a determination of whether or not the activity which is taking place is an action which has been placed within the filter, as discussed with respect to block 74. If so, the action is recorded within the history log, as depicted in block 80 and the process returns to block 76 to proceed in an iterative fashion.

In the event the action taken with regard to a particular document is not an action which is specified within the filter established with respect to block 74, then the process so returns to block 76 to continue to function in an iterative fashion each time a document associated with a history log is accessed.

Upon reference to the foregoing those skilled in the art will appreciate that the applicants in the present invention have developed a method whereby only selected activities with respect to particular resource objects shall be stored within a document history log. In this manner, the control and maintenance of documents or resource objects within a distributed data processing system may be efficiently carried out without an undue burden with regard to memory space or processing, as with known document history logs.

While the invention has been particularly shown and described with reference to a preferred embodiment, it will be understood by those skilled in the art that various changes in form and detail may be made therein without departing from the spirit and scope of the invention.

We claim:

1. A computer implemented method in a distributed data processing system for efficiently maintaining a record of activities relating to a selected resource object among a plurality of resource objects accessible by a plurality of users within said distributed data processing system, said computer implemented method comprising the steps of:

creating within said distributed data processing system a history log associated with a selected resource object among a plurality of resource objects accessible by a plurality of users within said distributed data processing system for which an activity selective history is desired;

specifying at least one activity of interest among a plurality of all possible activities with respect to said selected resource object;

recording, in response to said specifying step, an indication of said at least one activity within said history log associated with said selected resource object;

monitoring within said distributed data processing system only the occurrence of said at least one activity of interest associated with said selected resource object; and recording within said history log associated with said selected resource object an indication of the occurrence of only said at least one activity of interest.

2. The computer implemented method in a data processing system for efficiently maintaining a record activities relating to a selected resource object among a plurality of resource objects accessible by a plurality of users within said distributed data processing system according to claim 1, further including the step of determining whether or not the occurrence of said at least one activity of interest is recordable.

3. The computer implemented method in a data processing system for efficiently maintaining a record of activities relating to a selected resource object among a plurality of resource objects accessible by a plurality of users within said distributed data processing system according to claim 2, further including the step of generating an indication of the nonrecordability of said at least one activity of interest in the event the occurrence of said at least one activity of interest is not recordable.

4. The computer implemented method in a data processing for efficiently maintaining a record of activities relating to a selected resource object among a plurality of resource objects accessible by a plurality of users within said distributed data processing system according to claim 1, further including the step of determining whether a particular user has authority to specify said at least one activity of interest for recording.

5. The computer implemented method in a data processing system for efficiently maintaining a record of activities relating to a selected resource object among a plurality of resource objects accessible by a plurality of users within said distributed data processing system according to claim 1, wherein said step of recording within said history log the occurrence of only said at least one activity of interest takes place in response to an access of said selected resource object by one of said plurality of users within said distributed data processing system.

6. A system for maintaining a record of activities relating to a selected resource object among a lurality of resource objects accessible by a plurality of users within a distributed data processing system, said system comprising:

a history log associated with a selected resource object among a plurality of resource objects accessible by a plurality of users within said distributed data processing system for which an activity selective history is desired;

means for specifying at least one activity of interest among a plurality of all possible activities with respect to said selected resource object;

means, associated with said history 1,g for recording an indication of said at least one activity of interest within said history log associated with said selected resource object in response to said specifying means;

means for monitoring within said distributed data processing system only the occurrence of said at least one activity of interest associated with said selected resource object, in response to said recorded indication; and means, associated with said history log, for recording within said history log associated with said selected resource object an indication of the occurrence of only said at least one activity of interest in response to said monitoring means.

* * * * *

UNITED STATES PATENT AND TRADEMARK OFFICE
CERTIFICATE OF CORRECTION

PATENT NO. : 5,119,493
DATED : June 2, 1992
INVENTOR(S) : Frederick L. Janis et al.

It is certified that error appears in the above-identified patent and that said Letters Patent is hereby corrected as shown below:

Change Column 3, line 46 "21" to --20--, Column 3, line 47 "12" to --18-- and Column 3, line 51 "60" to --10--.

Signed and Sealed this

Tenth Day of August, 1993

Attest:

MICHAEL K. KIRK

*Attesting Officer*  *Acting Commissioner of Patents and Trademarks*